United States Patent [19]

Aoshima et al.

[11] Patent Number: 5,300,579
[45] Date of Patent: Apr. 5, 1994

[54] VULCANIZABLE RUBBER COMPOSITION AND VULCANIZED RUBBER PRODUCT

[75] Inventors: Masashi Aoshima; Hironobu Shigematsu; Takeru Wadaki, all of Ibaraki; Mitsuji Tsuji, Ichihara, all of Japan

[73] Assignee: Sumitomo Chemical Company, Limited, Osaka, Japan

[21] Appl. No.: 868,189

[22] Filed: Apr. 14, 1992

[30] Foreign Application Priority Data

Apr. 18, 1991 [JP] Japan .................. 3-086569

[51] Int. Cl.$^5$ .................. C08F 255/04; C08F 255/06
[52] U.S. Cl. .................. 525/290; 525/289; 525/319; 525/320; 525/322; 525/324
[58] Field of Search .......... 525/289, 290, 319, 320, 525/322, 324, 331.8, 333.2, 332.5, 332.6, 333.5, 351, 354, 387, 211, 240, 241, 236, 238

[56] References Cited

U.S. PATENT DOCUMENTS

| | | | |
|---|---|---|---|
| 3,271,477 | 9/1966 | Kresge | 525/290 |
| 4,814,388 | 3/1989 | Nagai et al. | 525/290 |
| 4,973,627 | 11/1990 | Mitchell | 525/211 |

FOREIGN PATENT DOCUMENTS

| | | |
|---|---|---|
| 0227855 | 7/1987 | European Pat. Off. |
| 0303782 | 2/1989 | European Pat. Off. |
| 2336423 | 7/1977 | France |
| 1093074 | 11/1967 | United Kingdom |

OTHER PUBLICATIONS

World Patents Index Latest, Derwent Publications Ltd., London, GB; AN 86-275172(42) & JP-A-61 200 107 (Japan Synthetic Rubber Co. Ltd.) Sep. 4, 1986.
World Patents Index Latest, Derwent Publications Ltd., London, GB; AN 88-201263(29) & JP-A-63 137 910 (Sumitomo Naugatuck KK) Jun. 9, 1988.
Chemical Abstracts, vol. 97, No. 18, Apr. 24, 1982, Columbus, Ohio, US; abstract No. 145740D, & JP-A-57067645, Sumitomo Naugatuck KK; "Impact Resistant Thermoplastic Polymer Compositions", p. 38.

*Primary Examiner*—Vasu S. Jagannathan
*Attorney, Agent, or Firm*—Stevens, Davis, Miller & Mosher

[57] ABSTRACT

A vulcanizable rubber composition comprising an ethylene-α-olefin copolymer modified with an alkenyl aromatic compound alone or in combination with at least one other polymerizable compound, as a polymer component. The vulcanizable rubber composition is excellent in weather-resistance, ozone-resistance and heat-resistance and has a high strength, a high rigidity and a high hardness.

25 Claims, No Drawings

VULCANIZABLE RUBBER COMPOSITION AND VULCANIZED RUBBER PRODUCT

This invention relates to a vulcanizable ethylene-α-olefin rubber composition which is excellent in weather resistance, ozone resistance and heat resistance and has a high strength, a high rigidity and a high hardness and to a vulcanized rubber product produced from the vulcanizable ethylene-α-olefin rubber composition. Such rubber compositions and vulcanized rubber products can be widely utilized in various fields such as automobile parts, industrial parts, construction materials and the like.

Since ethylene-α-olefin-non-conjugated diene copolymers (referred to hereinafter as EPDM in some cases as propylene is most often used as the α-olefin) are excellent in respect of processability, weather resistance, ozone resistance, heat resistance and the like, they are widely used in fields such as automobile parts, industrial parts, construction materials and the like. However, it has been difficult to impart high strength, high rigidity and high hardness to the EPDM without impairing the excellent features of the EPDM.

In order to obtain a compounding capable of giving a hardness as high as, for example, 85 or more (JIS K6301, spring type hardness test A), a diene rubber such as natural rubber, styrene-butadiene rubber, acrylonitrile-butadiene rubber or the like is used as a rubber component. In this case, a high hardness rubber composition can be easily produced by increasing the amount of a vulcanizing agent. However, the rubber composition thus obtained is inferior in weather resistance and heat resistance. On the other hand, when a rubber having a small unsaturated hydrocarbon content such as an EPDM is used as the rubber composition, a high hardness rubber cannot be obtained in the same manner as above.

Thus, when the EPDM is used as a rubber component, an EPDM having a high ethylene content is used as a polymer component, a reinforcing agent such as carbon black or the like is used in a large amount, and a softening agent and a plasticizer are compounded in small amounts therewith, or alternatively, a thermosetting alkylphenol resin is added to the above-mentioned EPDM. When the former method is used, however, the Mooney viscosity of unvulcanized rubber is greatly increased, and hence, the resulting rubber composition is inferior in processability of Banbury mixing or roll mixing, and there is a physical property problem that the rubber composition is insufficient in rigidity. Also, when the latter method is used, the processability is better than when the former method is used; however, curing reaction proceeds upon heating and simultaneously water is liberated because the curing reaction of alkylphenol resin is through dehydration condensation. Hence, when the composition is subjected to continuous vulcanization under the atmospheric pressure which is excellent in productivity and has recently been widely adopted in rubber industries, the water liberated causes expansion of the rubber and hence a satisfactory product is difficult to obtain. Only a vulcanizing method under pressure such as vulcanization by using a steam vulcanizing autoclave or press-vulcanization which is inferior in productivity can be applied to the composition, and there are such physical property problems that the recovery speed after deformation, namely snappiness, is inferior and the rigidity is insufficient.

There is also a method comprising blending a polyolefin resin such as polyethylene, polypropylene or the like or a polystyrene resin with the EPDM; however, when a polyethylene resin is blended with the EPDM the rigidity is insufficient and when a polypropylene resin is blended with the EPDM the Mooney viscosity of the resulting unvulcanized rubber composition is greatly increased. In particular, there is a problem that the composition is inferior in processability of roll mixing or extrusion processability. Also, when a polystyrene resin is blended with the EPDM there is a problem that the resulting composition has a low strength.

An object of this invention is to provide a vulcanizable rubber composition and a vulcanized rubber product which have a high strength, a high rigidity and a high hardness with retaining the weather resistance, ozone resistance and heat resistance which are the characteristic features of an ethylene-α-olefin copolymer rubber, this having been desired to be solved in prior art.

According to this invention, there is provided a vulcanizable rubber composition which is excellent in weather resistance, ozone resistance and heat resistance and has a high strength, a high rigidity and a high hardness and which comprises an ethylene-α-olefin copolymer modified with an alkenyl aromatic compound or a combination of an alkenyl aromatic compound with at least one other polymerizable compound (referred to hereinafter as the modified ethylene-α-olefin copolymer), as a polymer component. This invention also provides a vulcanized rubber product obtained from the vulcanizable rubber composition by curing.

In this invention, the modified ethylene-α-olefin copolymer can be obtained by graft-polymerizing an alkenyl aromatic compound or a combination of an alkenyl aromatic compound with at least one other polymerizable compound onto an ethylene-α-olefin copolymer.

For the graft-polymerization, there may be used known various methods such as suspension method, solution method, bulk method using an extruder and the like. Among them, the suspension method is most preferably used.

The suspension method consists of subjecting an ethylene-α-olefin copolymer ground or in the form of pellets to graft-polymerization in aqueous suspension (see Japanese Patent Application Kokoku No. 57-40,166; 58-53,643; 62-10,565; and 63-64,446).

The solution method consists of dissolving an ethylene-α-olefin copolymer in a hydrocarbon solvent such as benzene, toluene, xylene or the like, and subjecting the resulting solution to graft-polymerization.

The bulk method using an extruder consists of impregnating an ethylene-α-olefin copolymer with a polymerizable monomer and a radical initiator and then mixing them in an extruder at 150° C. or more as disclosed in Japanese Patent Application Kokoku No. 57-13,567.

The process for producing the modified ethylene-α-olefin copolymer is explained in more detail below.

The α-olefin in the ethylene-α-olefin copolymer includes propylene, butene-1, 4-methylpentene-1, hexene-1, octene-1 and the like. Of these, propylene and butene-1 are preferred.

The ethylene/α-olefin weight ratio in the copolymer is 90/10 to 30/70, preferably 80/20 to 50/50. A highly crystalline copolymer having an ethylene content of more than 90% by weight is difficult to mold under conventional rubber molding conditions, and a copolymer having an ethylene content of less than 30% by weight has a high glass transition point (Tg), and the rubbery properties of the copolymer are deteriorated.

The ethylene-α-olefin copolymer may comprise a non-conjugated diene as a copolymerized monomer, and the non-conjugated diene includes 1,4-pentadiene, 1,4-hexadiene, divinylbenzene, dicyclopentadiene, methylenenorbornene, ethylidenenorbornene, vinylnorbornene and the like. Of these, dicyclopentadiene and ethylidenenorbornene are preferred. These monomers may be used alone or in combination of two or more.

The non-conjugated diene content of the copolymer is 2-40, preferably 10-35, in terms of iodine value. When the iodine value is less than 2, vulcanization with a sulfur system which is the most general vulcanization method becomes difficult. On the other hand, when the iodine value exceeds 40, gelation tends to take place during the modification, and the production cost becomes high.

The Mooney viscosity of the copolymer ($ML_{1+4}100°$ C.) is preferably 10-200, more preferably 20-120.

The alkenyl aromatic compound used in the modification is most preferably styrene though o-methylstyrene, p-methylstyrene, m-methylstyrene and α-methylstyrene may also be used. These compounds may be used alone or in combination of two or more.

In the modification, at least one other polymerizable monomer may be used, and said polymerizable monomer includes unsaturated nitriles such as acrylonitrile, methacrylonitrile and the like; unsaturated fatty acids such as acrylic acid, methacrylic acid and the like; alkyl (meth)acrylates such as methyl acrylate, methyl methacrylate and the like; glycidyl acrylate; glycidyl methacrylate; allyl glycidyl ether; vinyl chloride; and the like. These compounds may be used alone or in combination of two or more. In particular, acrylonitrile, methyl acrylate and glycidyl methacrylate are preferred in view of copolymerizability with the alkenyl aromatic compound.

The amount of the alkenyl aromatic compound used in the modification is such that the content of the bound alkenyl aromatic compound in the modified copolymer becomes 5-60% by weight, preferably 10-50% by weight. When it is intended to obtain the modified copolymer by a suspension method, the alkenyl aromatic compound is used in an amount of 5-150 parts by weight, preferably 10-100 parts by weight, per 100 parts by weight of the ethylene-α-olefin copolymer.

When the content of the bound alkenyl aromatic compound in the modified ethylene-α-olefin copolymer is less than 5% by weight, it is impossible to obtain the objective vulcanizable rubber composition having a high strength, a high rigidity and a high hardness. On the other hand, when it exceeds 60% by weight, the viscosity of the modified copolymer becomes too high, and hence, the processability of Banbury mixing of the modified copolymer is deteriorated and the elongation of a vulcanizate becomes so insufficient that the vulcanizate cannot be used in practice.

The vulcanizable rubber composition of this invention may comprise, if necessary, an unmodified ethylene-α-olefin copolymer or a styrene resin or both of them as a polymer component.

The styrene resin includes styrene homopolymer (GPPS), rubber-modified polystyrene (HIPS), styrenebutadiene block copolymer, styrene-acrylonitrile copolymer and the like.

For improving the processability or other purposes, the rubber composition of this invention may comprise, if necessary, a polyethylene resin or a polypropylene resin.

In the preparation of the vulcanizable rubber composition of this invention, the polymer component may be compounded with one or more compounding agents appropriately selected from those which are conventionally used in rubber applications such as filler, softening agent, vulcanizing agent, vulcanizing accelerator, co-vulcanizing agent, processing aid, antifoaming agent, zinc white, stearic acid, antioxidant and the like.

The vulcanizing agent may be a compound which is conventionally used as a vulcanizing agent for ethylene-α-olefin copolymer, that is to say, a sulfur-containing vulcanizing agent, which includes sulfur, morpholine disulfide, alkylphenol disulfides, tetramethylthiuram disulfide, dipentamethylthiuram tetrasulfide and the like.

Also, the vulcanizing agent may be an organic peroxide-containing vulcanizing agent, which includes dicumyl peroxide, 2,5-dimethyl-2,5-di(t-butylperoxy)hexane, 1,3-bis(t-butylperoxyisopropyl)benzene, 1,1-bis(t-butylperoxy)-3,3,5-trimethylcyclohexane and the like.

The sulfur-containing vulcanizing agent and the organic peroxide-containing vulcanizing agent may be combined, if necessary, with a vulcanizing accelerator and an accelerator activator or crosslinking coagent.

To the vulcanizable rubber composition of this invention can be applied a conventional processing method. That is, the vulcanizable rubber composition of this invention is prepared by adding the above-mentioned compounding agent to the polymer component and mixing them by means of an open roll mill, a Banbury mixer, a kneader or the like, and, if necessary, subjected to extrusion molding or calender molding into a desired shape, after which the molded article is vulcanized.

The vulcanization can be effected by press curing, curing by using a steam vulcanizing autoclave, injection molding, hot air-vulcanization, UHF vulcanization, LCM vulcanization, PCM vulcanization or the like alone or in combination. In particular, the vulcanizable rubber composition of this invention is important to a continuous vulcanization method capable of producing a long article with a good efficiency.

The vulcanizable rubber composition and vulcanized product of this invention obtained by the above-mentioned method are excellent in weather resistance, ozone resistance and heat resistance, and have a high strength, a high rigidity and a high hardness.

The above-mentioned excellent properties enable the vulcanizable rubber composition and vulcanized rubber product of this invention to be used in a wide range of automobile parts, industrial parts, construction materials and the like. The automobile parts include packings, hoses, wiper blade, glassrun rubber, weather strip, the hard solid rubber portion of a complex of a soft solid rubber and a hard solid rubber, the solid rubber portion of a complex of sponge rubber and solid rubber applicable to door seal and trunk seal, mudguard and the like; the industrial parts include rubber roll, sealing material, packing and the like; and the construction materials include setting block, rubber tile, gasket and the like.

This invention is specifically explained below referring to Examples. The Examples are not by way of limitation but by way of illustration.

EXAMPLES 1 to 6

An ethylene-propylene rubber as shown as EPDM-A or EPDM-B in Table 2 was used as the ethylene-α-olefin copolymer, and treated with the following recipe at 110° C. by a suspension method to obtain a styrene-modified EPDM:

Per 100 parts by weight of the ethylene-propylene rubber ground were used 20, 40 or 60 parts by weight of styrene, 350 parts by weight of pure water, 4 parts by weight of calcium phosphate, 4 parts by weight of Pluronic F-68 (manufactured by Asahi Denka Kogyo K.K.) and 1 part by weight of Sunperox TO (manufactured by Sanken Kako Inc.).

The styrene contents of the modified EPDMs obtained are shown in Table 2.

The polymer, FEF black, zinc white No. 3 and stearic acid shown in Table 1 were first mixed in a BR type Banbury mixer and thereafter the remaining materials shown in Table 1 were added to the resulting mixture on a 10-inch open roll to prepare a compound.

The compound obtained was vulcanized at 160° C. for 20 minutes in a press curing means to obtain a vulcanized rubber.

The vulcanized rubbers thus obtained were subjected to measurement of physical properties to obtain the results shown in Table 2.

COMPARATIVE EXAMPLES 1 to 6

The same procedure as in Examples 1–6 was repeated, except that a blend of an ethylene-propylene rubber (EPDM-A or EPDM-B) and a polystyrene resin was substituted for the polymer, to obtain vulcanized rubbers.

Physical properties of the vulcanized rubbers obtained are shown in Table 3.

TABLE 1

|  | Compounded amount (parts by wt.) |
|---|---|
| Polymer | 100 |
| FEF black | 40 |
| Zinc white No. 3 | 5 |
| Stearic acid | 1 |
| Sulfur | 1.5 |
| Soxinol BZ *1 | 1.5 |
| Soxinol TT *2 | 0.8 |
| Soxinol M *3 | 1.5 |

Note:
*1 Zinc di-n-butyldithiocarbamate
*2: Tetramethylthiuram disulfide
*3: 2-Mercaptobenzothiazole

TABLE 2

|  | Example 1 | Example 2 | Example 3 | Example 4 | Example 5 | Example 6 |
|---|---|---|---|---|---|---|
| Styrene-Modified EPDM | | | | | | |
| Copolymer to be modified | EPDM-A *4 | EPDM-A *4 | EPDM-A *4 | EPDM-B *5 | EPDM-B *5 | EPDM-B *5 |
| Styrene content in modified copolymer (wt. %) | 16.7 | 28.6 | 37.5 | 16.7 | 28.6 | 37.5 |
| Physical properties of unvulcanized rubber (JIS K6300) | | | | | | |
| Mooney scorch test ML 125° C. | | | | | | |
| Vm | 63 | 87 | 97 | 79 | 89 | 101 |
| t5 (min) | 6.5 | 5.9 | 6.6 | 7.8 | 8.6 | 7.4 |
| tΔ30 (min) | 5.9 | 6.0 | 5.2 | 4.5 | 4.6 | 4.3 |
| ODR characteristics 160° C. (ASTM D2084) | | | | | | |
| MH (kg · cm) | 94 | 95 | 94 | 111 | 110 | 108 |
| ML (kg · cm) | 18 | 21 | 22 | 20 | 22 | 23 |
| t'50 (min) | 3.5 | 3.8 | 4.4 | 3.7 | 4.3 | 4.6 |
| t'90 (min) | 11.0 | 13.7 | 15.8 | 12.4 | 15.4 | 18.9 |
| Physical properties of vulcanized rubber | | | | | | |
| 100% Modulus (kgf/cm$^2$) | 102 | 158 | 185 | 80 | 128 | 158 |
| Tensile strength (kgf/cm$^2$) | 230 | 238 | 240 | 228 | 223 | 207 |
| Elongation (%) | 280 | 200 | 180 | 290 | 240 | 170 |
| Hardness (JIS-A) | 90 | 95 | 98 | 85 | 92 | 96 |
| Heat resistance 100° C. × 168 hrs in Geer oven | | | | | | |
| Change of tensile strength (%) | +8 | +7 | +7 | +8 | +8 | +9 |
| Change of elongation (%) | −14 | −15 | −11 | −17 | −13 | −12 |
| Change of hardness (JIS-A) | +2 | +1 | +1 | +2 | +1 | +1 |
| Ozone resistance 50 pphm, 40° C., 20% elongation Cracks after 200 hrs | No crack | No crack | No crack | No crack | No crack | No crack |

Note:
*4: Ethylene-porpylene-ethylidenenorborene copolymer rubber
Mooney viscosity (ML$_{1+4}$100° C.) 35
Ethylene/propylene weight ratio 78/22
Iodine value 15
*5: Ethylene-propylene-ethylidenenorbornen copolymer rubber
Mooney viscosity (ML$_{1+4}$100° C.) 35
Ethylene/propylene weight ratio 65/35
Iodine value 15

TABLE 3

| | Comparative Example | | | | | |
|---|---|---|---|---|---|---|
| | 1 | 2 | 3 | 4 | 5 | 6 |
| EPDM-A (parts by wt.) | 85 | 70 | 60 | — | — | — |
| EPDM-B (parts by wt.) | — | — | — | 85 | 70 | 60 |
| Polystyrene resin *6 (parts by wt.) | 15 | 30 | 40 | 15 | 30 | 40 |
| Physical properties of unvulcanized rubber (JIS K6300) | | | | | | |
| Mooney scorch test ML 125° C. | | | | | | |
| Vm | 49 | 59 | 68 | 57 | 67 | 74 |
| t5 (min) | 11.8 | 11.5 | 10.6 | 9.5 | 10.3 | 11.0 |
| tΔ30 (min) | 7.3 | 8.2 | 8.1 | 5.7 | 6.5 | 6.9 |
| ODR characteristics 160° C. (ASTM D2084) | | | | | | |
| MH (kg · cm) | 80 | 75 | 73 | 98 | 89 | 82 |
| ML (kg · cm) | 10 | 12 | 12 | 12 | 13 | 13 |
| t'50 (min) | 3.9 | 4.7 | 4.5 | 4.0 | 4.4 | 4.7 |
| t'90 (min) | 12.5 | 15.1 | 16.4 | 14.9 | 17.5 | 18.3 |
| Physical properties of vulcanized rubber | | | | | | |
| 100% Modulus (kgf/cm$^2$) | 82 | 93 | 105 | 60 | 83 | — |
| Tensile strength (kgf/cm$^2$) | 173 | 127 | 107 | 150 | 119 | 95 |
| Elongation (%) | 330 | 240 | 120 | 320 | 240 | 90 |
| Hardness (JIS-A) | 89 | 94 | 98 | 84 | 93 | 98 |
| Heat resistance 100° C. × 168 hrs in Geer oven | | | | | | |
| Change of tensile strength (%) | +1 | +3 | +2 | +1 | +4 | +2 |
| Change of elongation (%) | −18 | −21 | −25 | −13 | −17 | −11 |
| Change of hardness (JIS-A) | +2 | +1 | ±0 | +2 | +1 | +1 |
| Ozone resistance 50 pphm, 40° C., 20% elongation Cracks after 200 hrs | No crack | No crack | No crack | No crack | No crack | No crack |

Note:
*6 ESBRITE 8 (manufactured by Sumitomo Chemical Co., Ltd.)

What is claimed is:

1. A vulcanizable rubber composition comprising an ethylene-α-olefin copolymer having a 30-90 wt% of ethylene content which is graft-modified with an alkenyl aromatic compound and a vulcanizing agent, wherein the modified ethylene-α-olefin copolymer has a bound alkenyl aromatic compound content of 5-60 wt% of the graft-modified copolymer.

2. The vulcanizable rubber composition according to claim 1, wherein the alkenyl aromatic compound is styrene, o-methylstyrene, p-methylstyrene or α-methylstyrene.

3. The vulcanizable rubber composition according to claim 1, wherein the ethylene-α-olefin copolymer before the modification is an ethylene-α-olefin-non-conjugated diene copolymer having a non-conjugated diene content of 2-40 in terms of iodine value.

4. The vulcanizable rubber composition according to claim 3, wherein the alkenyl aromatic compound is styrene, o-methylstyrene, p-methylstyrene or α-methylstyrene.

5. The vulcanizable rubber composition according to claim 3, wherein the nonconjugated diene is 1,4-pentadiene, 1,4-hexadiene, divinylbenzene, dicyclopentadiene, methylenenorbornene, ethylidenenorbornene or vinylnorbornene.

6. The vulcanizable rubber composition according to claim 5, wherein the nonconjugated diene is dicyclopentadiene or ethylidenenorbornene.

7. The vulcanizable rubber composition according to claim 3, wherein the modified ethylene-α-olefin copolymer is an ethylene-α-olefin copolymer which is grafted by alkenyl aromatic compound in an aqueous slurry in the presence of a radical polymerization catalyst.

8. The vulcanizable rubber composition according to claim 7, wherein the alkenyl aromatic compound is in an amount of 5-150 wt parts per 100 wt parts of the ethylene-α-olefin copolymer.

9. The vulcanizable rubber composition according to claim 3, wherein the composition further comprises a polymer component of unmodified ethylene-α-olefin copolymer and/or styrene resin.

10. The vulcanizable rubber composition according to claim 3, wherein the vulcanizing agent is a sulfur-containing vulcanizing agent or an organic peroxide-containing vulcanizing agent.

11. The vulcanizable rubber composition according to claim 10, wherein the sulfur-containing vulcanizing agent is morpholine disulfide, an alkylphenol disulfide, tetramethylthiuram disulfide or dipentamethyl thiuram tetrasulfide.

12. The vulcanizable rubber composition according to claim 10, wherein the organic peroxide-containing vulcanizing agent is dicumyl peroxide, 2,5-dimethyl-2,3-di(t-butylperoxy)hexane, 1,3-bis(t-butylperoxyisopropyl)benezene or 1,1-bis(t-butylperoxy)-3,3,5-trimethylcyclohexane.

13. The vulcanizable rubber composition according to claim 10, which further contains a vulcanizing accelerator and a co-vulcanizing agent.

14. The vulcanized rubber product obtained from the vulcanizable rubber composition according to claim 3 by vulcanizing through a continuous vulcanization method.

15. The vulcanizable rubber composition according to claim 1, wherein the α-olefin is propylene, butene-1,4-methylpenentene-1,hexene-1, or octent-1.

16. The vulcanizable rubber composition according to claim 15, wherein the α-olefin is propylene or butene-1.

17. The vulcanizable rubber composition according to claim 1, wherein the modified ethylene-α-olefin copolymer is an ethylene-α-olefin copolymer which is grafted by alkenyl aromatic compound in an aqueous slurry in the presence of a radical polymerization catalyst.

18. The vulcanizable rubber composition according to claim 17, wherein the alkenyl aromatic compound is in an amount of 5-150 wt parts per 100 wt parts of the ethylene-α-olefin copolymer.

19. The vulcanizable rubber composition according to claim 1, wherein the composition further comprises a polymer component of unmodified ethylene-α-olefin copolymer and-or styrene resin.

20. The vulcanizable rubber composition according to claim 1, wherein the vulcanizing agent is a sulfur-containing vulcanizing agent or an organic peroxide-containing vulcanizing agent.

21. The vulcanizable rubber composition according to claim 20, wherein the sulfur-containing vulcanizing agent is morpholine disulfide, an alkylphenol disulfide, tetraethylthiuram disulfide or dipentamethyl thiuram tetrasulfide.

22. The vulcanizable rubber composition according to claim 20, wherein the organic peroxide-containing vulcanizing agent is dicumyl peroxide, 2,5-dimethyl-2,3-di(t-butylperoxy)hexane, 1,3-bis(t-butylperoxyisopropyl)benezene or 1,1-bis(t-butylperoxy)-3,3,5-trimethylcyclohexane.

23. The vulcanizable rubber composition according to claim 20, which further contains a vulcanizing accelerator and a co-vulcanizing agent.

24. The vulcanized rubber product obtained from the vulcanizable rubber composition according to claim 1 by vulcanizing through a continuous vulcanization method.

25. The vulcanizable rubber composition according to claim 1, wherein the α-olefin is propylene, butent-1,4-methylpenentene-1,hexene-1, or octene-1.

* * * * *